(12) United States Patent
Fiete (10) Patent No.: US 7,636,488 B2
(45) Date of Patent: Dec. 22, 2009

(54) USER ADJUSTABLE IMAGE ENHANCEMENT FILTERING

(75) Inventor: Robert D. Fiete, Fairport, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 928 days.

(21) Appl. No.: 10/740,318

(22) Filed: Dec. 18, 2003

(65) Prior Publication Data

US 2005/0135697 A1    Jun. 23, 2005

(51) Int. Cl.
*G06K 9/40* (2006.01)
(52) U.S. Cl. ............................................. 382/260
(58) Field of Classification Search ............... 382/260
See application file for complete search history.

(56) References Cited

U.S. PATENT DOCUMENTS

2003/0067982 A1* 4/2003 Sheraizin et al. ........ 375/240.08
2005/0213840 A1* 9/2005 Chen ........................... 382/260

OTHER PUBLICATIONS

Rafael C. Gonzalez Digital Image Processing, Nov. 9, 2001, Prentice Hall, 2/E, pp. 5,29,175,177,183,184,246,247,354,359,361,384,381,397.*

* cited by examiner

*Primary Examiner*—Vikkram Bali
*Assistant Examiner*—Max Shikhman
(74) *Attorney, Agent, or Firm*—RatnerPrestia (57) ABSTRACT

In an image enhancement method, computer program product, and system a set of boundary frequencies within a frequency spectrum are defined. The boundary frequencies divide the spectrum into a plurality of different spatial frequency regions. A digital image is then processed with a filter having a plurality of functions. Each function is exclusive to one of the spatial frequency regions. The functions of adjoining regions have equal values at respective boundary frequencies. A set of peak and or valley filter values of the functions at the respective boundary frequencies can be defined.

23 Claims, 5 Drawing Sheets

| | | | | | | | | | | |
|---|---|---|---|---|---|---|---|---|---|---|
| -0.005 | -0.009 | -0.017 | -0.026 | 0.022 | 0.087 | 0.022 | -0.026 | -0.017 | -0.009 | -0.005 |
| -0.006 | -0.011 | -0.020 | -0.030 | 0.016 | 0.025 | 0.016 | -0.030 | -0.020 | -0.011 | -0.006 |
| -0.005 | -0.011 | -0.023 | -0.043 | 0.049 | 0.304 | 0.049 | -0.043 | -0.023 | -0.011 | -0.005 |
| -0.017 | -0.026 | -0.055 | -0.091 | -0.063 | -0.330 | -0.063 | -0.091 | -0.055 | -0.026 | -0.017 |
| 0.008 | -0.010 | -0.061 | -0.201 | 0.068 | 0.405 | 0.068 | -0.201 | -0.061 | -0.010 | 0.008 |
| 0.075 | 0.029 | -0.054 | -0.879 | 0.214 | 3.525 | 0.214 | -0.879 | -0.054 | 0.029 | 0.075 |
| 0.008 | -0.010 | -0.061 | -0.201 | 0.068 | 0.405 | 0.068 | -0.201 | -0.061 | -0.010 | 0.008 |
| -0.017 | -0.026 | -0.055 | -0.091 | -0.063 | -0.330 | -0.063 | -0.091 | -0.055 | -0.026 | -0.017 |
| -0.005 | -0.011 | -0.023 | -0.043 | 0.049 | 0.304 | 0.049 | -0.043 | -0.023 | -0.011 | -0.005 |
| -0.006 | -0.011 | -0.020 | -0.030 | 0.016 | 0.025 | 0.016 | -0.030 | -0.020 | -0.011 | -0.006 |
| -0.005 | -0.009 | -0.017 | -0.026 | 0.022 | 0.087 | 0.022 | -0.026 | -0.017 | -0.009 | -0.005 |

USER ADJUSTABLE IMAGE ENHANCEMENT FILTERING

FIELD OF THE INVENTION

The invention relates to digital image processing and more particularly relates to image filtering with user adjustable image enhancement filters.

BACKGROUND OF THE INVENTION

An image capture system, such as a camera, will produce an image that is a degraded representation of the object being imaged. If the imaging system is assumed to be linear and shift invariant, then the image can be expressed as $$g(x,y)=f(x,y)*h(x,y)+n(x,y),\quad\text{(Equation 1)}$$

where g(x,y) is the intensity value of the image data, f(x,y) is the intensity value of the object being imaged, h(x,y) is the point-spread function of the imaging system, and n(x,y) is the random additive noise. In this notation (x,y) represents the coordinate locations and * represents a two-dimensional convolution operation. If the Fourier transform is taken, then the image spectrum can be expressed as $$G(u,v)=F(u,v)H(u,v)+N(u,v),\quad\text{(Equation 2)}$$

where G(u,v) is the image spectrum, F(u,v) is the object spectrum, H(u,v) is the transfer function of the imaging system, and N(u,v) is the noise spectrum. In this notation (u,v) represents the spatial frequency coordinate locations. The modulation transfer function, MTF(u,v), is the modulus of the system transfer function, H(u,v), and measures the reduction of the image contrast as a function of spatial frequencies of an image capture system. The diffraction of light causes the MTF to fall below unity for diffraction-limited incoherent imaging systems, thus imaging systems have the effect of blurring the object being imaged.

Images are typically processed with an image enhancement filter to improve the resulting image quality. In the Fourier domain, linear image enhancement methods multiply the image data with a filter, i.e.

$$G'(u,v)=G(u,v)W(u,v),\quad\text{(Equation 3)}$$

where G'(u,v) is the enhanced image spectrum and W(u,v) is the enhancement filter. The inverse Fourier transform of G'(u,v) results in the enhanced image g'(x,y). In the spatial domain, the image data is convolved with the Inverse Fourier transform of the enhancement filter, i.e.

$$g'(x,y)=g(x,y)*w(x,y),\quad\text{(Equation 4)}$$

where w(x,y) is the image enhancement kernel, given by the inverse Fourier transform of the image enhancement filter.

It should be noted that applications exist where the image enhancement filter may actually degrade the image data further. For example, if the image contains a high amount of noise, the image enhancement filter may be designed to blur the image data, resulting in an image that can be interpreted easier.

If the noise term is ignored, then the restoration function that best reproduces the object is simply given by the inverse of the transfer function, $$W(u,v)=\frac{1}{H(u,v)}.\quad\text{(Equation 5)}$$

In general the inverse filter leads to unsatisfactory image quality because H(u,v) can have very small values, which will cause W(u,v) to be large and enhance any noise that occurs in the image. If H(u,v)=0, then W(u,v) is not defined.

A linear restoration filter designed to minimize the difference between f(x,y) and g'(x,y) is the Wiener-Helstrom filter, given by $$W(u,v)=\frac{H^*(u,v)}{|H(u,v)|^2+\frac{|N(u,v)|^2}{|F(u,v)|^2}}.\quad\text{(Equation 6)}$$

For most imaging systems, the Wiener-Helstrom filter is greater than unity at the low and middle spatial frequencies to sharpen the image but then transitions to values below unity at the higher spatial frequencies where the noise dominates, thus blurring the high details in the image where the noise dominates. Unfortunately, the Wiener-Helstrom filter requires knowledge of H(u,v), N(u,v), and F(u,v), which are usually not all known. Also, the Wiener-Helstrom filter is designed to minimize the difference between f(x,y) and g'(x,y) such that g'(x,y) is an estimate of the original object, but this generally does not produce the optimal image enhancement for image exploitation.

A gain term, $\alpha$, has been added to the Wiener-Helstrom filter in prior art, given by $$W(u,v)=\frac{H^*(u,v)}{|H(u,v)|^2+\alpha\frac{|N(u,v)|^2}{|F(u,v)|^2}},\quad\text{(Equation 7)}$$

to allow the user to trade-off the image sharpness with the enhancement of the noise. Although this variable gain Wiener-Helstrom filter tends to sharpen the image while minimizing the enhancement of the noise, the peak value may not be at a frequency desired by the user.

Figure 1:
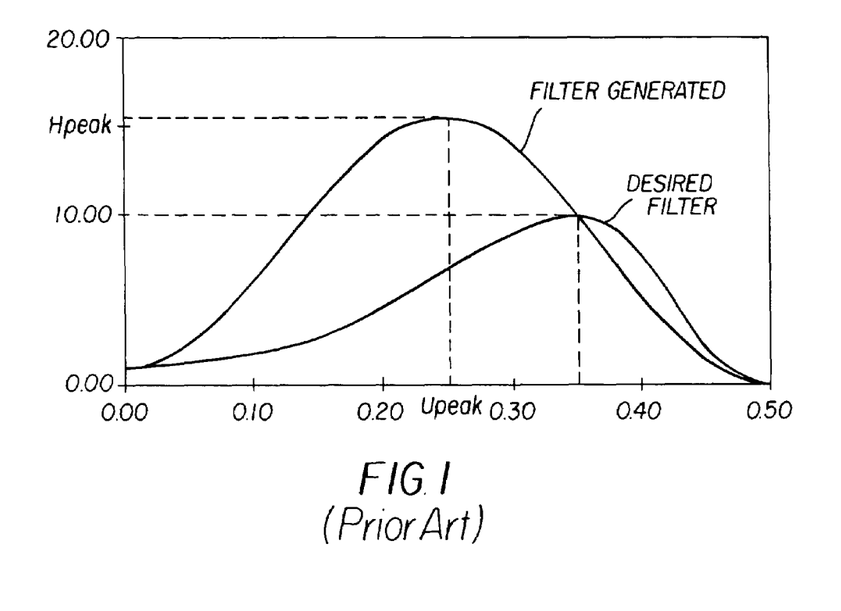
FIG. 1 illustrates a prior art one-dimensional plot of a designed filter that does not have a peak at the desired value or at the desired spatial frequency.

It is common practice to design image enhancement filters that amplify spatial frequencies that are not dominated by noise and attenuate spatial frequencies that are dominated by noise. A DFT (discrete Fourier Transform) is typically used in the art to generate an image enhancement filter with the desired values at specified frequencies, but this method does not allow the user to specify a peak amplitude of the filter. For example, one can design a one-dimensional filter that has a value of 1.0 at u=0, peaks with a value of 10 at u=0.35, and a value of zero at u=0.5. The spatial frequency is in units of cycles/pixel, such that the Nyquist frequency $u_N$=0.5. A 5-pixel kernel would have the response shown in FIG. 1. Note that the image enhancement filter has the desired shape of the Wiener-Helstrom filter and W(u) has the correct values at the specified spatial frequencies, but the peak value of the filter is not the desired value at the desired spatial frequency. More points can be specified to force the DFT to produce the desired shape with the correct peak, but this is time-consuming and will result in larger kernel sizes for processing, which is undesirable if the enhancement processing is performed in the spatial domain.

It would thus be desirable to provide a fast and simple method for image enhancement filtering that allows a user to specify filter spatial boundary frequencies and, if desired, to specify peak filter values at the specified spatial boundary frequencies.

SUMMARY OF THE INVENTION

The invention is defined by the claims. The invention, in broader aspects, provides an image enhancement method, computer program product, and system, in which a set of boundary frequencies within a frequency spectrum are defined. The boundary frequencies divide the spectrum into a plurality of different spatial frequency regions. A digital image is then processed with a filter having a plurality of functions. Each function is exclusive to one of the spatial frequency regions. The functions of adjoining regions have equal values at respective boundary frequencies. A set of peak and/or valley filter values of the functions at the respective boundary frequencies can be defined.

It is an advantageous effect of the invention that an improved method, computer program product, and system are provided that allow fast and simple image enhancement filtering, in which a user specifies filter spatial boundary frequencies and, if desired, specifies peak and/or valley filter values at the specified spatial boundary frequencies.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 4b show the one-dimensional filter profiles of the 11×11 kernel in FIG. 4a;

DETAILED DESCRIPTION OF THE INVENTION

Briefly summarized, in the method, a set of boundary frequencies are defined so as to divide a frequency spectrum into a plurality of different spatial frequency regions. Filter values at the boundary frequencies can also be defined. A filter is provided that has a different function in each of the spatial frequency regions. The functions provide the defined filter values at the respective spatial frequency regions. A digital image is then processed with the filter.

The image can be processed with the filter in Fourier space or the variable space defined by another unitary transform. The filter can also be used to generate an image enhancement kernel with the specified values. Convolving the image with the kernel produces the enhanced image. For convenience, the filter is generally discussed herein in terms of Fourier and vector spaces. The term "spatial frequency" is used to refer to spatial frequency in Fourier space or generally to spatial frequency in Fourier space and equivalent features of other variable spaces, as will be understood from context. The same considerations apply to other terms relating to a variable space, such as "frequency spectrum".

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals as sometimes referred to herein in relation to the underlying information using referents such as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to systems including specific pieces of apparatus for performing the operations described herein. Apparatus such as a programmable computer may be specially constructed for the required purposes, or may comprise a general purpose computer selectively activated or reconfigured by a computer program stored in the computer.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

References to "in a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The invention is thus inclusive of combinations of the embodiments described herein.

Elements not specifically shown or described herein may be selected from those known in the art. Certain aspects of the embodiment to be described may be provided in software. Given the method as shown and described according to the invention in the following materials, software not specifically shown, described or suggested herein that is useful for implementation of the invention is conventional and within the ordinary skill in such arts. The method of the invention is useful with, but not limited to use with dental color image processing procedures well known to those of skill in the art.

It will be understood that the system and computer program product of the present invention may make use of image manipulation algorithms and processes that are well known. Accordingly, the present description will be directed in particular to those algorithms and processes forming part of, or cooperating more directly with, the method of the present invention. Thus, it will be understood that the system and computer program product of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs). An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

A computer or machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The present invention is a simple method for designing an image enhancement filter in the Fourier domain or other variable domain that will result in a filter with specified peak and valley values at specified frequencies. The term "local extremes" and like terms are used herein to refer generically to both peaks and valleys. The present invention designs a filter by dividing the spatial frequencies into one or more regions, determines a function for each region to generate the desired filter, and ensures that the filter values at each boundary between frequency regions are equal to prevent excessive ringing in the imagery. The general expression for a one-dimensional filter design using the present invention is given by $$W(u) = a_n f_n(u) + b_n, u_n \leq u \leq u_{n+1}$$ (Equation 8)

where u is the spatial frequency, $f_n(u)$ is the function that describes the filter in the $n^{th}$ region in the frequency domain, $u_n$ is the spatial frequency at which a functional boundary occurs, and $a_n$ and $b_n$ are constants that assure that adjoining functions $f_n(u)$ have the same values at the boundaries. A two-dimensional filter is similarly divided into two-dimensional spatial frequency regions.

In a particular embodiment, a two-dimensional circularly symmetric filter with a mid-frequency local extreme is designed by specifying:

1) the filter value at the center of the filter (DC spatial frequency), W(0,0);
2) the spatial frequency where mid-frequency local extreme occurs;
3) the filter value of the mid-frequency local extreme; and
4) the filter values at Nyquist frequency.

Figure 2:
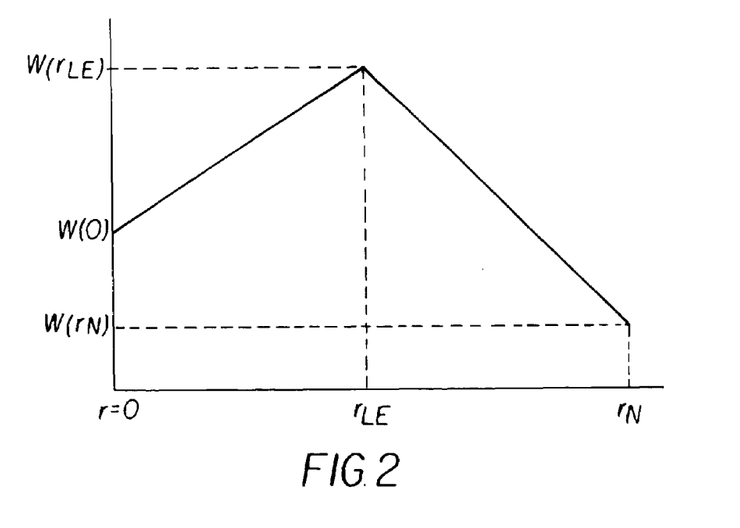
FIG. 2 illustrates a one-dimensional plot of a filter designed to have a specified peak value at a specified frequency using linear functions in the present invention.

A linear function can be used in Equation 8 to define different spatial frequency regions of the filter to produce the desired local extreme value at a desired frequency, given by $$W(r) = \begin{cases} [W(r_{LE}) - W(0)]\frac{r}{r_{LE}} + W(0), & 0 \leq r \leq r_{LE} \\ [W(r_N) - W(r_{LE})]\frac{(r - r_{LE})}{(r_N - r_{LE})} + W(r_{LE}), & r_{LE} < r \leq r_N \\ W_d(r), & r > r_N \end{cases}$$ (Equation 9)

where $r = \sqrt{u^2 + v^2}$, $r_{LE}$ is the specified radial spatial frequency at which the local extreme occurs, $W(r_{LE})$ is the specified value of the filter at $r_{LE}$, W(0) is the value of the filter at r=0, $W(r_N)$ is the specified filter value at the Nyquist frequency $r_N$, and $W_d(r)$ is a function that defines W(r) when $r > r_N$. If the spatial frequency r is normalized to cycles/pixel, then the Nyquist frequency $r_N = 0.5$ and $0 < r_{LE} < 0.5$. In one embodiment, $W_d(r) = W(r_N)$. Using a linear function has the disadvantage that the function is not smoothly varying where the local extreme occurs, i.e. the derivative at the boundary is not zero, as shown in FIG. 2. Sharp features in an image filter could adversely affect the image quality of the filtered image.

An embodiment that produces zero-valued derivatives at the boundaries uses cosine functions to generate a circularly symmetric filter with a local extreme value at a specified frequency is given by, $$W(r) = \qquad \text{(Equation 10)}$$

$$\begin{cases} \dfrac{W(0) - W(r_{LE})}{2} \cos\left[\pi\left(\dfrac{r}{r_{LE}}\right)\right] + \dfrac{W(0) + W(r_{LE})}{2}, \; 0 \leq r \leq r_{LE} \\ \dfrac{[W(r_{LE}) - W(r_N)]}{2} \cos\left[\pi\left(\dfrac{(r - r_{LE})}{(r_N - r_{LE})}\right)\right] + \dfrac{W(r_{LE}) + W(r_N)}{2}, \; r_{LE} < r \leq r_N \\ W_d(r), \; r > r_N \end{cases}$$

Figure 3:
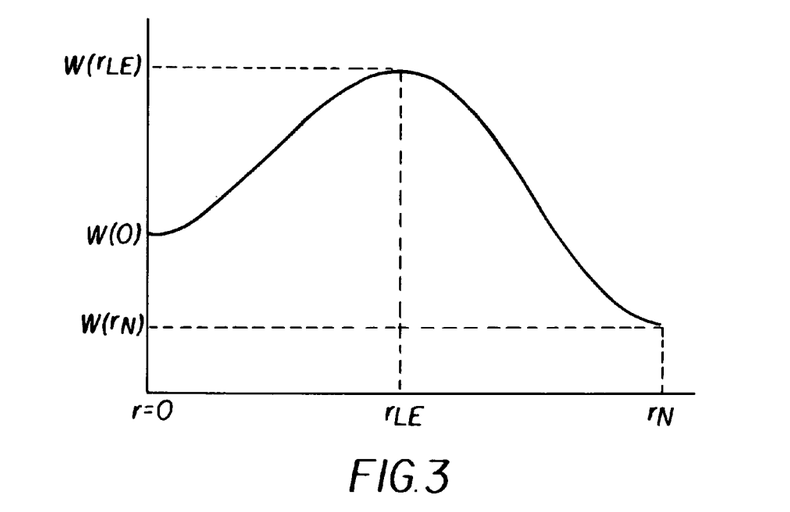
FIG. 3 illustrates a one-dimensional plot of a filter designed to have a specified peak value at a specified frequency using cosine functions in the present invention.

FIG. 3 illustrates the relationships between $r_{LE}$, $W(r_{LE})$, $W(0)$, and $W(r_N)$ in a one-dimensional profile of a filter designed in this embodiment using cosine functions.

An N×N pixel kernel can be generated by calculating the DFT (Discrete Fourier Transform) of the filter. The kernel is convolved with the image g(x,y) to generate the enhanced image g'(x,y). If N is odd, then x and y are integers bounded by $$\pm\dfrac{(N-1)}{2},$$

and the kernel is given by $$w(x, y) = \dfrac{1}{N^2} \sum_{m=-\frac{(N-1)}{2}}^{\frac{(N-1)}{2}} \sum_{n=-\frac{(N-1)}{2}}^{\frac{(N-1)}{2}} W\left(\dfrac{m}{N}, \dfrac{n}{N}\right) \qquad \text{(Equation 11)}$$

$$\exp\left(-2\pi i x \dfrac{m}{N}\right)\exp\left(-2\pi i x \dfrac{n}{N}\right).$$

Figure 4A:
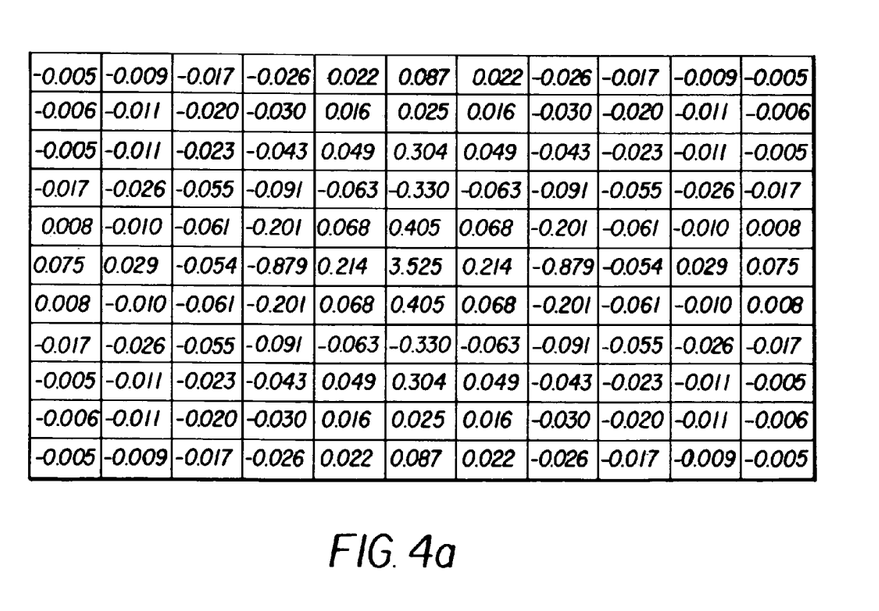
FIG. 4a shows an 11×11 kernel generated from a filter using the present invention.
Figure 4B:
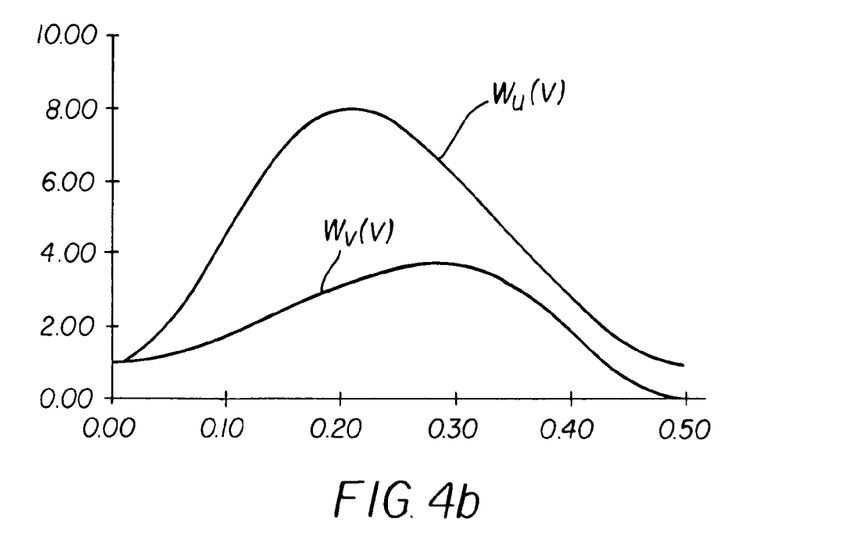

The method of the present invention also can be used to generate asymmetric filters where the attributes can be designated separately for the u-direction and the v-direction. In one embodiment the present invention can be used to generate an asymmetric filter with local extreme values at a specified frequencies by, $$W(u, v) = \qquad \text{(Equation 12)}$$

$$\begin{cases} W(0), & u = v = 0 \\ \dfrac{|u|}{|u| + |v|} W_u(u) + \dfrac{|v|}{|u| + |v|} W_v(v), & \text{elsewhere} \end{cases},$$

where W(0) is the value of the filter when u=v=0, $W_u(u)$ and $W_v(v)$ are calculated using Equation 10. $W_u(u)$ and $W_v(v)$ can each have different values for $u_{LE}$ and $v_{LE}$; $W(u_{LE})$ and $W(v_{LE})$; and $W(u_N)$ and $W(v_N)$ to produce different filter responses in the u-direction and the v-direction. FIG. 4a shows the 11×11 kernel generated from a filter with W(0,0)=1 and with $u_{LE}$=0.2, $W(u_{LE})$=8, and $W(u_N)$=1.0 for $W_u(u)$ and with $v_{LE}$=0.3, $W(v_{LE})$=4, and $W(v_N)$=0.0 for $W_v(v)$. FIG. 4b shows the one-dimensional filter profiles for the kernel in FIG. 4a. Note that the filter has the specified values, including the local extreme values, at the specified frequencies.

In another embodiment of this invention, the functions are cosine terms raised to a power p. This will allow the user to vary the rate at which the peaks and valleys rise and fall. A circularly symmetric filter with a local extreme value at a specified frequency is given by, $$W(r) = \qquad \text{(Equation 13)}$$

$$\begin{cases} \dfrac{W(0) - W(r_{LE})}{2}\left[2\left(\dfrac{1}{2}\left\{\cos\left[\pi\left(\dfrac{r}{r_{LE}}\right)\right] + 1\right\}\right)^p - 1\right] + \\ \dfrac{W(0) - W(r_{LE})}{2}, \; 0 \leq r \leq r_{LE} \\ \dfrac{W(r_{LE}) - W(r_N)}{2}\left[2\left(\dfrac{1}{2}\left\{\cos\left[\pi\left(\dfrac{r - r_{LE}}{r_N - r_{LE}}\right)\right] + 1\right\}\right)^p - 1\right] + \\ \dfrac{W(r_{LE}) - W(r_N)}{2}, \; r_{LE} < r \leq r_N \\ W_d(r), \; r > r_N \end{cases}$$

Figure 5:
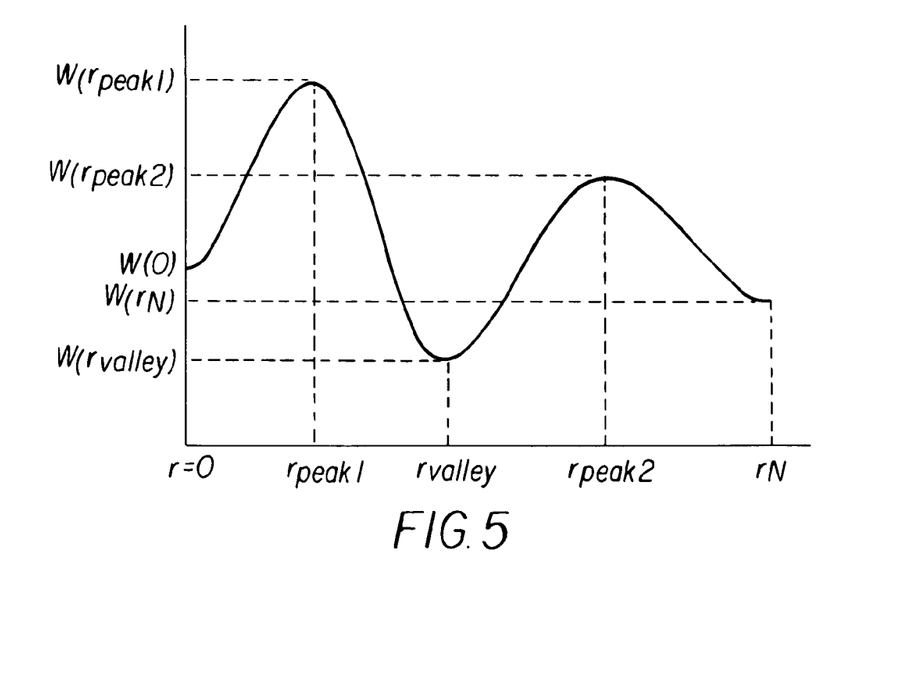
FIG. 5 illustrates a one-dimensional plot of a circularly symmetric filter designed to have two peaks and one valley using the present invention.

Some imaging systems, such as sparse apertures systems, generate transfer functions with multiple local extremes where an enhancement filter may be desired that attempts to compensate for these multiple local extremes. The method of the present invention can be used to generate, filters with multiple local extremes. In one embodiment, a circularly symmetric filter design that uses cosine functions in this embodiment to generate a filter with two peak and one valley values at specified frequencies is given by, $$W(r) = \begin{cases} \dfrac{W(0) - W(r_{peak1})}{2} \cos\left[\pi\left(\dfrac{r}{r_{peak1}}\right)\right] + \\ \dfrac{W(0) - W(r_{peak1})}{2}, \; 0 \leq r \leq r_{peak1} \\ \dfrac{W(r_{peak1}) - W(r_{valley})}{2} \cos\left[\pi\left(\dfrac{r - r_{peak1}}{r_{valley} - r_{peak1}}\right)\right] + \\ \dfrac{W(r_{peak1}) + W(r_{valley})}{2}, \; r_{peak1} < r \leq r_{valley} \\ \dfrac{W(r_{valley}) - W(r_{peak2})}{2} \cos\left[\pi\left(\dfrac{r - r_{valley}}{r_{peak2} - r_{valley}}\right)\right] + \\ \dfrac{W(r_{valley}) + W(r_{peak2})}{2}, \; r_{valley} < r \leq r_{peak2} \\ \dfrac{W(r_{peak2}) - W(r_N)}{2} \cos\left[\pi\left(\dfrac{r - r_{peak2}}{r_N - r_{peak2}}\right)\right] + \\ \dfrac{W(r_{peak2}) + W(r_N)}{2}, \; r_{peak2} < r \leq r_N \\ W_d(r), \; r > r_N \end{cases} \qquad \text{(Equation 14)}$$

where $r_{peak1}$ is the specified radial spatial frequency at which the first peak occurs, $W(r_{peak1})$ is the specified value of the filter at $r_{peak1}$, $r_{valley}$ is the specified radial frequency at which the valley occurs, $W(r_{valley})$ is the specified value of the filter at $r_{valley}$, $r_{peak2}$ is the specified radial spatial frequency at which the second local extreme occurs, $W(r_{peak2})$ is the specified value of the filter at $r_{peak2}$, W(0) is the value of the filter at r=0, $W(r_N)$ is the specified filter value at the Nyquist frequency, and $W_d(r)$ is a function that defines W(r) when $r > r_N$. FIG. 5 illustrates the relationships between $r_{peak1}$, $W(r_{peak1})$, $r_{valley}$, $W(r_{valley})$, $r_{peak2}$, $W(r_{peak2})$, $W(0)$, and $W(r_N)$ in a one-dimensional profile of a filter designed in this embodiment. The present invention can generate filters with more than two peaks and one valley be increasing the number of regions that the spatial domain is divided into.

Figure 6:
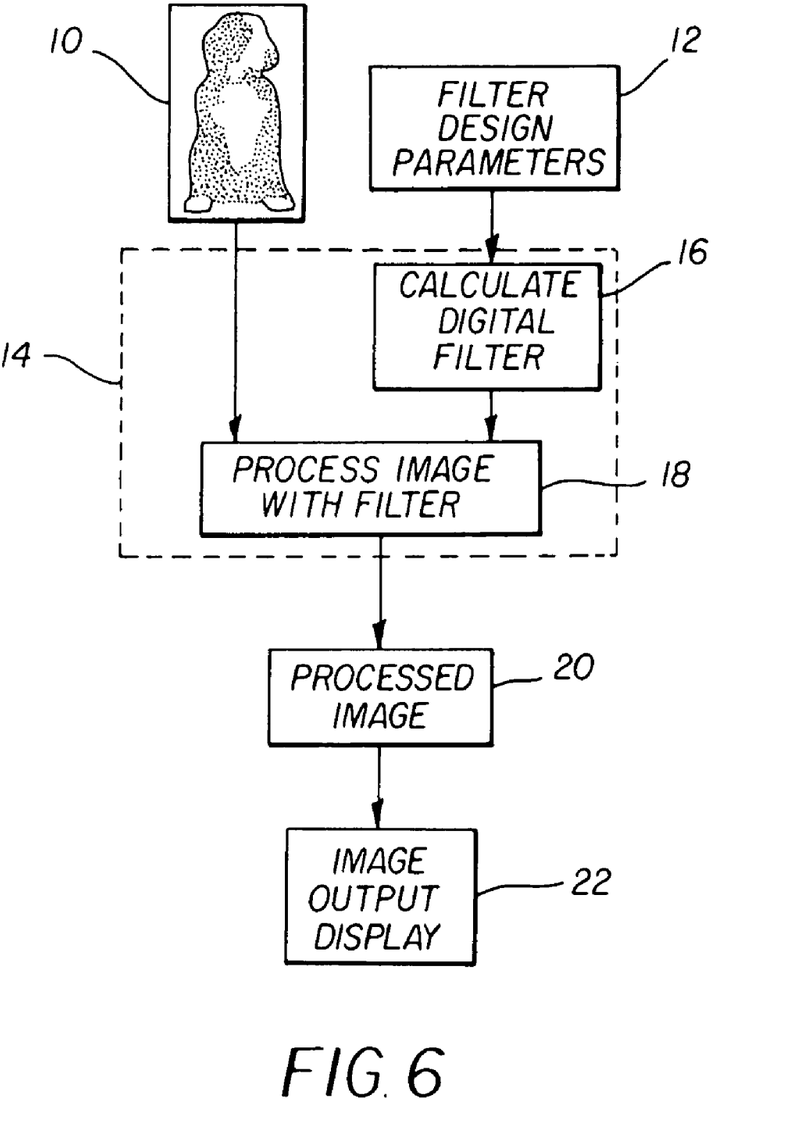
FIG. 6 is a process flow for a system on which the present invention is implemented.

In particular embodiments of the method, the user can change the input parameters and view the processed image, thus allowing the user to fine tune the image displayed by varying the filter design parameters. Referring to FIG. 6, in an embodiment of the system, an image 10 and filter design parameters 12 are input into a processor 14. The processor can accept user input identifying one or more boundary frequencies and can also accept input identifying local extreme filter values at respective boundary frequencies. Other values, such as selections of functions and powers of individual functions can also be input.

Figure 7:
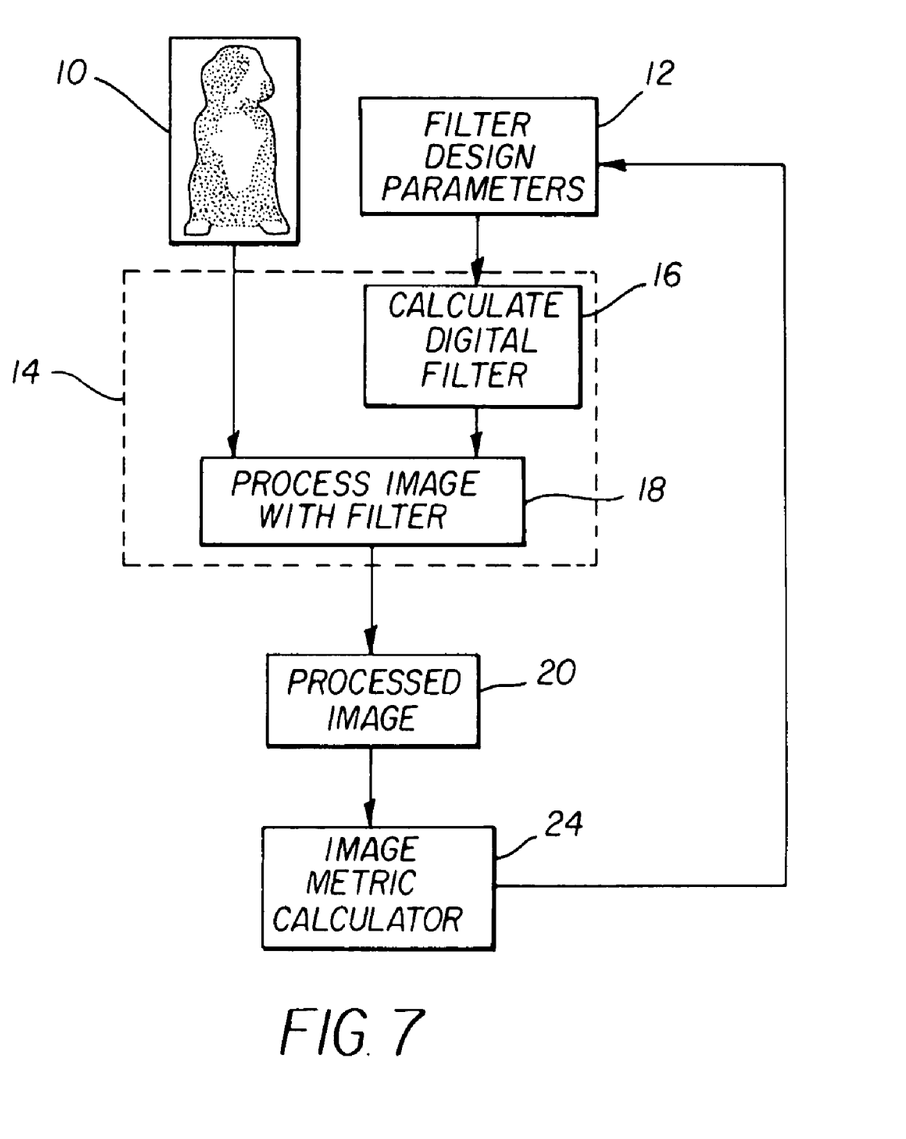
FIG. 7 is a process flow for a system on which the present invention is implemented that calculates an image metric.

The processor 16 calculates the digital filter then the processor 16 processes (indicated by reference number 18) the image 10 with the filter. The processor 14 outputs the processed image 20, which is then viewed by the user on an image output display 22. This process can be repeated, at the user's option, with varying filter design parameters 12 until the desired processed image 20 is achieved. FIG. 7 shows a system that inputs the processed image 20 into another processor 24 that calculates an image metric, and the process can be repeated with varying filter design parameters 12 until the desired metric is achieved, that is, the metric is in a predetermined range. An example of a suitable metric is signal to noise ratio. The filter parameters can be varied automatically when the process is repeated, or the user can be asked to input new parameters. Automatic variation of parameters can follow a predetermined pattern or algorithm, such as stepwise changes in values.

The invention has been described in detail with particular reference to certain preferred embodiments thereof, but it will be understood that variations and modifications can be effected within the spirit and scope of the invention.

What is claimed is:

1. An image enhancement method comprising the steps of:
defining a set of boundary frequencies within a frequency spectrum, said boundary frequencies dividing said spectrum into a plurality of different spatial frequency regions; and
processing a digital image with a filter having a plurality of functions, each said function being exclusive to one of said spatial frequency regions, said functions of adjoining said regions having equal values at respective said boundary frequencies, wherein said functions have cosine terms having a power that is not equal to one or zero, and wherein each function is monotonically increasing or decreasing in value as a function of frequency.

2. The method of claim 1 wherein said defining further comprises accepting user input identifying said boundary frequencies.

3. The method of claim 1 further comprising defining a set of local extreme filter values at respective said boundary frequencies, said functions of adjoining said regions having said local extreme filter values at respective said boundary frequencies.

4. The method of claim 3 wherein said defining of said set of boundary frequencies further comprises accepting user input identifying said boundary frequencies and said defining of said local extreme filter values further comprises accepting user input identifying said local extreme filter values.

5. The method of claim 4 wherein said processing provides a processed image and said method further comprises displaying said processed image and repeating said defining and processing steps.

6. The method of claim 1 wherein said processing provides a processed image and said method further comprises generating an image metric from said processed image and repeating said defining and processing steps if said metric is not within a predetermined range.

7. The method of claim 1 wherein said functions are cosine functions.

8. The method of claim 1 wherein said functions are dimensionally asymmetric.

9. The method of claim 1 wherein said set has one boundary frequency.

10. The method of claim 1 wherein said set has more than one boundary frequency.

11. The method of claim 1 wherein said filter is circularly symmetrical.

12. The method of claim 1 wherein said filter has a one-dimensional profile given by:

$$W(r) = \begin{cases} \frac{W(0) - W(r_{LE})}{2}\left[2\left(\frac{1}{2}\left\{\cos\left[\pi\left(\frac{r}{r_{LE}}\right)\right]+1\right\}\right)^P - 1\right] + \\ \frac{W(0) + W(r_{LE})}{2}, 0 \le r \le r_{LE} \\ \frac{W(r_{LE}) - W(r_N)}{2}\left[2\left(\frac{1}{2}\left\{\cos\left[\pi\left(\frac{r-r_{LE}}{r_N-r_{LE}}\right)\right]+1\right\}\right)^P - 1\right] + \\ \frac{W(r_{LE}) - W(r_N)}{2}, r_{LE} < r \le r_N \end{cases}$$

wherein p is a real number, $r=\sqrt{u^2+v^2}$, $r_{LE}$ is the specified radial spatial frequency at which the local extreme occurs, $W(r_{LE})$ is the value of the filter at $r_{LE}$, $W(0)$ is the value of the filter at $r=0$ $r_N$ is the Nyquist frequency, $W(r_N)$ is the filter value at the Nyquist frequency $r_N$ and $W_d(r)$ is a function that defines $W(r)$ when $r > r_N$.

13. The method of claim 12 wherein $r_N=0.5, 0<r_{LE}<0.5$, and $W_d(r) = W(r_N)$.

14. The method of claim 1 wherein said filter has a two-dimensional profile given by:

$$W(u,v) = \begin{cases} W(0), & u=v=0 \\ \frac{|u|}{|u|+|v|}W_u(u) + \frac{|v|}{|u|+|v|}W_v(v), & \text{elsewhere} \end{cases}$$

wherein $W(0)$ is the value of the filter when $u=v=0$;

$$W(u) = \begin{cases} \frac{W(0) - W(u_{LE})}{2}\left[2\left(\frac{1}{2}\left\{\cos\left[\pi\left(\frac{u}{u_{LE}}\right)\right]+1\right\}\right)^P - 1\right] + \\ \frac{W(0) + W(u_{LE})}{2}, 0 \le u \le u_{LE} \\ \frac{W(u_{LE}) - W(u_N)}{2}\left[2\left(\frac{1}{2}\left\{\cos\left[\pi\left(\frac{u-u_{LE}}{u_N-u_{LE}}\right)\right]+1\right\}\right)^P - 1\right] + \\ \frac{W(u_{LE}) - W(u_N)}{2}, u_{LE} < u \le u_N \\ W_d(u), u > u_N \end{cases}$$

wherein p is a real number, $u_{LE}$ is the specified radial spatial frequency at which the local extreme occurs, $W(u_{LE})$ is the value of the filter at $u_{LE}$, $W(0)$ is the value of the filter at u=0, $u_N$ is the Nyquist frequency, $W(u_N)$ is the filter value at the Nyquist frequency $u_N$, and $W_d(u)$ is a function that defines $W(u)$ when $u>u_N$; and $$W(v) = \begin{cases} \frac{W(0)-W(v_{LE})}{2}\left[2\left(\frac{1}{2}\left\{\cos\left[\pi\left(\frac{v}{v_{LE}}\right)\right]+1\right\}\right)^P - 1\right] + \\ \frac{W(0)+W(v_{LE})}{2}, 0 \leq v \leq v_{LE} \\ \frac{W(v_{LE})-W(v_N)}{2}\left[2\left(\frac{1}{2}\left\{\cos\left[\pi\left(\frac{v-v_{LE}}{v_N-v_{LE}}\right)\right]+1\right\}\right)^P - 1\right] + \\ \frac{W(v_{LE})-W(v_N)}{2}, v_{LE} < v \leq v_N \\ W_d(v), v > v_N \end{cases}$$

wherein p is a real number, vu is the specified radial spatial frequency at which the local extreme occurs, $W(v_{LE})$ is the value of the filter at $v_{LE}$, $W(0)$ is the value of the filter at v=0, $v_N$ is the Nyquist frequency, $W(v_N)$ is the filter value at the Nyquist frequency $v_N$, and $W_d(v)$ is a function that defines $W(v)$ when $v>v_N$.

15. The method of claim 1 wherein said processing further comprising calculating a unitary transform of said filter to provide a pixel kernel, and convolving said pixel kernel and said digital image.

16. A computer program product for enhancing an image, said product comprising: a computer readable storage medium having a computer program stored thereon for performing the steps of:
defining a set of boundary frequencies within a frequency spectrum, said boundary frequencies dividing said spectrum into a plurality of different spatial frequency regions; and
processing a digital image with a filter having a plurality of functions, each said function being exclusive to one of said spatial frequency regions, said functions of adjoining said regions having equal values at respective said boundary frequencies,
wherein said functions have cosine terms having a power that is not equal to one or zero, and
wherein each function is monotonically increasing and decreasing in value as a function of frequency.

17. An image enhancement method comprising the steps of:
accepting user input identifying a set of boundary frequencies dividing a spectrum into a plurality of different spatial frequency regions and a set of local extreme filter values at respective said boundary frequencies; and
processing a digital image with a filter having a plurality of functions to provide a processed image, each said function being exclusive to one of said spatial frequency regions, said functions of adjoining said regions having respective said local extreme filter values at respective said boundary frequencies, wherein said functions have cosine terms having a power that is not equal to one or zero, and
wherein each function is monotonically increasing or decreasing in value as a function of frequency.

18. The method of claim 17 further comprising displaying said processed image and repeating said accepting and processing steps.

19. An image enhancement system comprising:
a programmable computer having a microprocessor, computer memory, a computer program stored in said computer memory for performing the steps of:
defining a set of boundary frequencies within a frequency spectrum, said boundary frequencies dividing said spectrum into a plurality of different spatial frequency regions; and processing a digital image with a filter having a plurality of functions, each said function being exclusive to one of said spatial frequency regions, said functions of adjoining said regions having equal values at respective said boundary frequencies, wherein said functions have cosine terms having a power that is not equal to one or zero and wherein each function is monotonically increasing or decreasing in value as a function of frequency.

20. An image enhancement method comprising the steps of:
defining a set of boundary frequencies within a frequency spectrum, said boundary frequencies dividing said spectrum into a plurality of different spatial frequency regions; and
processing a digital image with a filter having a plurality of functions, each said function being exclusive to one of said spatial frequency regions, said functions of adjoining said regions having equal values at respective said boundary frequencies,
wherein said filter has a one-dimensional profile given by:

$$W(r) = \begin{cases} \frac{W(0)-W(r_{LE})}{2}\left[2\left(\frac{1}{2}\left\{\cos\left[\pi\left(\frac{r}{r_{LE}}\right)\right]+1\right\}\right)^P - 1\right] + \\ \frac{W(0)+W(r_{LE})}{2}, 0 \leq r \leq r_{LE} \\ \frac{W(r_{LE})-W(r_N)}{2}\left[2\left(\frac{1}{2}\left\{\cos\left[\pi\left(\frac{r-r_{LE}}{r_N-r_{LE}}\right)\right]+1\right\}\right)^P - 1\right] + \\ \frac{W(r_{LE})-W(r_N)}{2}, r_{LE} < r \leq r_N \\ W_d(r), r > r_N \end{cases}$$

wherein p is a real number, $r=\sqrt{u^2+v^2}$, $r_{LE}$ is the specified radial spatial frequency at which the local extreme occurs, $W(r_{LE})$ is the value of the filter at $r_{LE}$, $W(0)$ is the value of the filter at r=0, $r_N$ is the Nyquist frequency, $W(r_N)$ is the filter value at the Nyquist frequency $r_N$, and $W_d(r)$ is a function that defines $W(r)$ when $r>r_N$.

21. The method of claim 20 wherein $r_N=0.5$, $0<r_{LE}<0.5$, and $W_d(r)=W(r_N)$.

22. An image enhancement method comprising the steps of:
defining a set of boundary frequencies within a frequency spectrum, said boundary frequencies dividing said spectrum into a plurality of different spatial frequency regions; and
processing a digital image with a filter having a plurality of functions, each said function being exclusive to one of said spatial frequency regions, said functions of adjoining said regions having equal values at respective said boundary frequencies,
wherein said filter has a two-dimensional profile given by:

$$w(u,v) = \begin{cases} W(0), & u=v=0 \\ \frac{|u|}{|u|+|v|}W_u(u) + \frac{|v|}{|u|+|v|}W_v(v), & \text{elsewhere} \end{cases}$$

wherein W(0) is the value of the filter when u=v=0;

$$W(u) = \begin{cases} \frac{W(0)-W(u_{LE})}{2}\left[2\left(\frac{1}{2}\{\cos[\pi(\frac{u}{u_{LE}})]+1\}\right)^P - 1\right] + \\ \quad \frac{W(0)+W(u_{LE})}{2}, 0 \leq u \leq u_{LE} \\ \frac{W(u_{LE})-W(u_N)}{2}\left[2\left(\frac{1}{2}\{\cos[\pi(\frac{u-u_{LE}}{u_N-u_{LE}})]+1\}\right)^P - 1\right] + \\ \quad \frac{W(u_{LE})-W(u_N)}{2}, u_{LE} < u \leq u_N \\ W_d(u), u > u_N \end{cases}$$

wherein p is a real number, $u_{LE}$ is the specified radial spatial frequency at which the local extreme occurs, $W(u_{LE})$ is the value of the filter at $u_{LE}$, W(0) is the value of the filter at u=0, $u_N$ is the Nyquist frequency, $W(u_N)$ is the filter value at the Nyquist frequency $u_N$, and $W_d(u)$ is a function that defines W(u) when $u > u_N$; and $$W(v) = \begin{cases} \frac{W(0)-W(v_{LE})}{2}\left[2\left(\frac{1}{2}\{\cos[\pi(\frac{v}{v_{LE}})]+1\}\right)^P - 1\right] + \\ \quad \frac{W(0)+W(v_{LE})}{2}, 0 \leq v \leq v_{LE} \\ \frac{W(v_{LE})-W(v_N)}{2}\left[2\left(\frac{1}{2}\{\cos[\pi(\frac{v-v_{LE}}{v_N-v_{LE}})]+1\}\right)^P - 1\right] + \\ \quad \frac{W(v_{LE})-W(v_N)}{2}, v_{LE} < v \leq v_N \\ W_d(v), v > v_N \end{cases}$$

wherein p is a real number, $v_{LE}$ is the specified radial spatial frequency at which the local extreme occurs, $W(v_{LE})$ is the value of the filter at $v_{LE}$, W(0) is the value of the filter at v=0, $v_N$ is the Nyquist frequency, $W(v_N)$ is the filter value at the Nyquist frequency $v_N$, and $W_d(v)$ is a function that defines W(v) when $v > v_n$.

23. The method of claim 1 wherein each function is independent of another function.

* * * * *